United States Patent
Bagge

(10) Patent No.: US 9,279,511 B2
(45) Date of Patent: Mar. 8, 2016

(54) FLAPPER RELIEF VALVE

(71) Applicant: Hamilton Sundstrand Corporation, Windsor Locks, CT (US)

(72) Inventor: William J. Bagge, East Longmeadow, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 308 days.

(21) Appl. No.: 13/866,689

(22) Filed: Apr. 19, 2013

(65) Prior Publication Data

US 2014/0311595 A1 Oct. 23, 2014

(51) Int. Cl.
| | |
|---|---|
| *F16K 21/14* | (2006.01) |
| *F16K 17/00* | (2006.01) |
| *F16K 1/20* | (2006.01) |
| *F16K 17/04* | (2006.01) |
| *F16K 15/03* | (2006.01) |
| *F16K 27/02* | (2006.01) |
| *B60H 1/24* | (2006.01) |

(52) U.S. Cl.
CPC ............ *F16K 17/0413* (2013.01); *B60H 1/249* (2013.01); *F16K 1/20* (2013.01); *F16K 15/033* (2013.01); *F16K 21/14* (2013.01); *F16K 27/0227* (2013.01); *Y10T 137/7898* (2015.04)

(58) Field of Classification Search
CPC ..... F16K 1/50; F16K 15/033; F16K 17/0413; F16K 17/042; F16K 27/0227; F16K 21/14; F16K 1/20; B60H 1/249; Y10T 137/7898
USPC .................. 137/467, 527–527.6; 138/40, 46; 251/95, 98, 99, 111, 114, 116; 167/21
See application file for complete search history.

(56) References Cited

U.S. PATENT DOCUMENTS

| | | | | |
|---|---|---|---|---|
| 889,780 | A * | 6/1908 | Gibney | 384/190.7 |
| 1,233,391 | A * | 7/1917 | Mullane et al. | 251/274 |
| 1,239,015 | A * | 9/1917 | Key | 137/467 |
| 1,285,110 | A * | 11/1918 | Funk | 137/527 |
| 1,815,355 | A * | 7/1931 | Hamilton | 169/21 |
| 2,357,133 | A * | 8/1944 | Rider | 169/20 |
| 2,556,277 | A | 6/1951 | Hill | |

(Continued)

FOREIGN PATENT DOCUMENTS

WO 2012102620 A2 8/2012

OTHER PUBLICATIONS

EU Search report of International Application 14165223.0-1751 mailed Aug. 1, 2014.

*Primary Examiner* — Craig Schneider
*Assistant Examiner* — Frederick D Soski
(74) *Attorney, Agent, or Firm* — Cantor Colburn LLP

(57) ABSTRACT

A pressure relief valve is provided including a flapper pivotally mounted to a housing. The flapper is movable between a first position and a second position. A protrusion extends from a first surface of the flapper. A biasing mechanism is positioned near a first end of the flapper. The biasing mechanism is configured to apply a biasing force to the first surface of the flapper. A non-rotatable pin is arranged generally parallel to the first end of the flapper. A drag link is configured to pivot about the non-rotatable pin. The drag link includes a retaining feature and is substantially aligned with the protrusion on the flapper. When the flapper rotates to the second position, the retaining feature is configured to engage the protrusion to retain the flapper in the second position.

9 Claims, 8 Drawing Sheets

(56) References Cited

U.S. PATENT DOCUMENTS

| | | | | |
|---|---|---|---|---|
| 2,852,037 | A | * | 9/1958 | Downing et al. .............. 137/467 |
| 3,135,332 | A | * | 6/1964 | Merdinyan ...................... 169/22 |
| 3,292,709 | A | * | 12/1966 | Hodgman, Jr. .................. 169/21 |
| 4,508,139 | A | * | 4/1985 | Teumer .................... 137/315.33 |
| 6,668,858 | B1 | * | 12/2003 | Bazargan ...................... 137/559 |
| 2008/0224083 | A1 | | 9/2008 | Hill |
| 2010/0112924 | A1 | | 5/2010 | Alexander |
| 2012/0073277 | A1 | | 3/2012 | Gafforelli |
| 2013/0037278 | A1 | * | 2/2013 | Deurloo .......................... 169/22 |

* cited by examiner

FLAPPER RELIEF VALVE

BACKGROUND OF THE INVENTION

Exemplary embodiments of this invention generally relate to pressure relief valves and, more particularly, to a pressure relief valve configured to prevent damage to a fan.

An air cycle environmental control system (ECS) may be used to regulate the conditions of an enclosed environment, such as an aircraft cabin for example. An ECS generally includes a compress for pressurizing air input thereto, and a turbine for driving the compressor and for expanding and cooling the air. The ECS may be powered by the air input thereto from a compressor section of an engine, or may be powered by an auxiliary power unit (APU).

Check valves or other relief valves are commonly used in the air management circuits of the ECS to provide a bypass flow path when a ram system of the ECS is not functioning properly. Air drawn into a ram system by a fan first passes through a filter configured to prevent debris and particles from circulating through the ECS. Over time, the particles collected within the filter may form a blockage in the filter, thereby limiting the air drawn through the filter by the fan. The lack of air flowing through the filter may cause the fan to stall or operate in a surge condition which may lead to damage, or ultimately, replacement of the fan.

BRIEF DESCRIPTION OF THE INVENTION

According to one embodiment of the invention, a pressure relief valve is provided including a flapper pivotally mounted to a housing. The flapper is movable between a first position and a second position. A protrusion extends from a first surface of the flapper. A biasing mechanism is positioned near a first end of the flapper. The biasing mechanism is configured to apply a biasing force to the first surface of the flapper. A non-rotatable pin is arranged generally parallel to the first end of the flapper. A drag link is configured to pivot about the non-rotatable pin. The drag link includes a retaining feature and is substantially aligned with the protrusion on the flapper. When the flapper rotates to the second position, the retaining feature is configured to engage the protrusion to retain the flapper in the second position.

According to an alternate embodiment of the invention, a pressure relief valve is provided including a flapper pivotally mounted to a housing. The flapper is movable between a first position and a second position. A first end of the flapper includes a first protrusion and a second protrusion. A biasing mechanism is mounted to the housing. The biasing mechanism includes a retaining features adjacent a free end. The biasing mechanism is configured to contact the first protrusion when the flapper is in the first position. When the flapper rotates to the second position, the retaining feature is configured to engage the second protrusion to retain the flapper in the second position.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
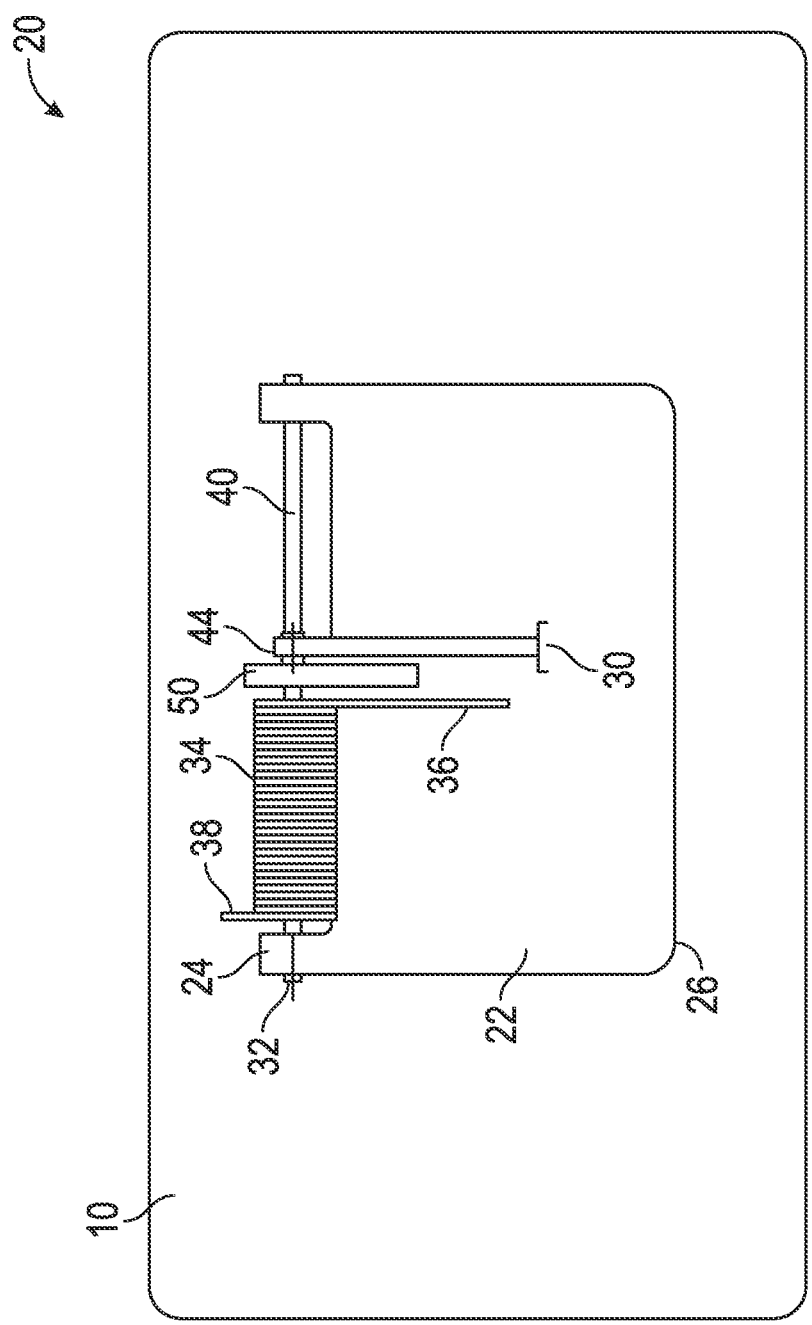
FIG. 1 is a top view of a pressure relief valve of an aircraft environmental control system (ECS) according to an embodiment of the invention.
Figure 2:
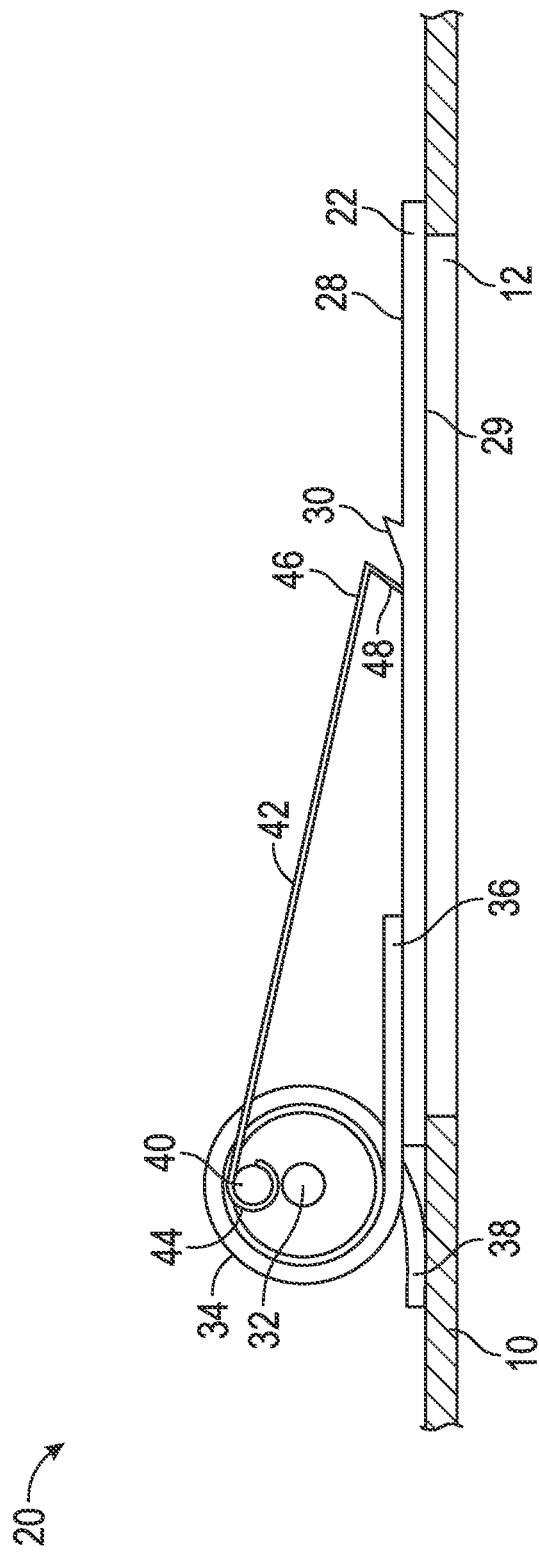
FIG. 2 is side view of a closed pressure relief valve of an ECS according to an embodiment of the invention.

The detailed description explains embodiments of the invention, together with advantages and features, by way of example with reference to the drawings.

DETAILED DESCRIPTION OF THE INVENTION

Referring now to the FIGS. 1-4, a flapper relief valve 20 configured for use in an environmental control system (ECS) of an aircraft is illustrated. The flapper relief valve 20 is mounted to a housing 10, such as near a fan and a filter for example, adjacent an opening 12. The flapper relief valve 20 includes a flapper 22 rotatably coupled to the housing 10 at a first end 24, such as with a hinge or a pin 32 for example. In one embodiment, the housing 10 of the flapper relief valve 20 is a flapper of a check valve (not shown) such that the flapper relief valve 20 is embedded within a larger check valve. The flapper 22 is configured to pivot between a first, closed position (see FIGS. 1 and 2) and a second, open position (see FIG. 3). In the closed position, the flapper 22 is arranged substantially parallel to the housing 10, such that the flapper 22 blocks a flow of air, or another fluid, through the opening 12. In one embodiment, the length of the flapper 22 is generally greater than the length of the opening 12 such that when the flapper 22 is in the first, closed position, a second end 26 of the flapper 22 overlays a portion of the housing 10. A protrusion 30 extends generally outwardly and at an angle from a first surface 28 of the flapper 22.

Positioned about the hinge 32 coupling the flapper 22 to the housing 10 is a biasing mechanism 34, such as a torsion spring for example. A first end 36 of the biasing mechanism 34 extends over a portion of the first surface 28 of the flapper 22, and a second end 38 of the biasing mechanism 34 extends over the housing 10. In one embodiment, the biasing mechanism 34 has a biasing force, such that a predetermined cracking pressure must be applied to a second, opposite surface 29 of the flapper 22 to rotate the flapper 22 between the first position and the second position.

A non-rotatable pin 40 extends generally parallel to the hinge 32. A drag link 42, mounted to the fixed pin 40 at a first end 44, extends towards the protrusion 30 of the flapper 22. In one embodiment, the drag link 42 and the protrusion 30 are substantially aligned (see FIG. 1). The free end 46 of the drag link 42 includes a retaining feature 48, such as a hook complementary to the protrusion for example, configured to engage the protrusion 30 when the flapper 22 is in the second position.

Figure 3:
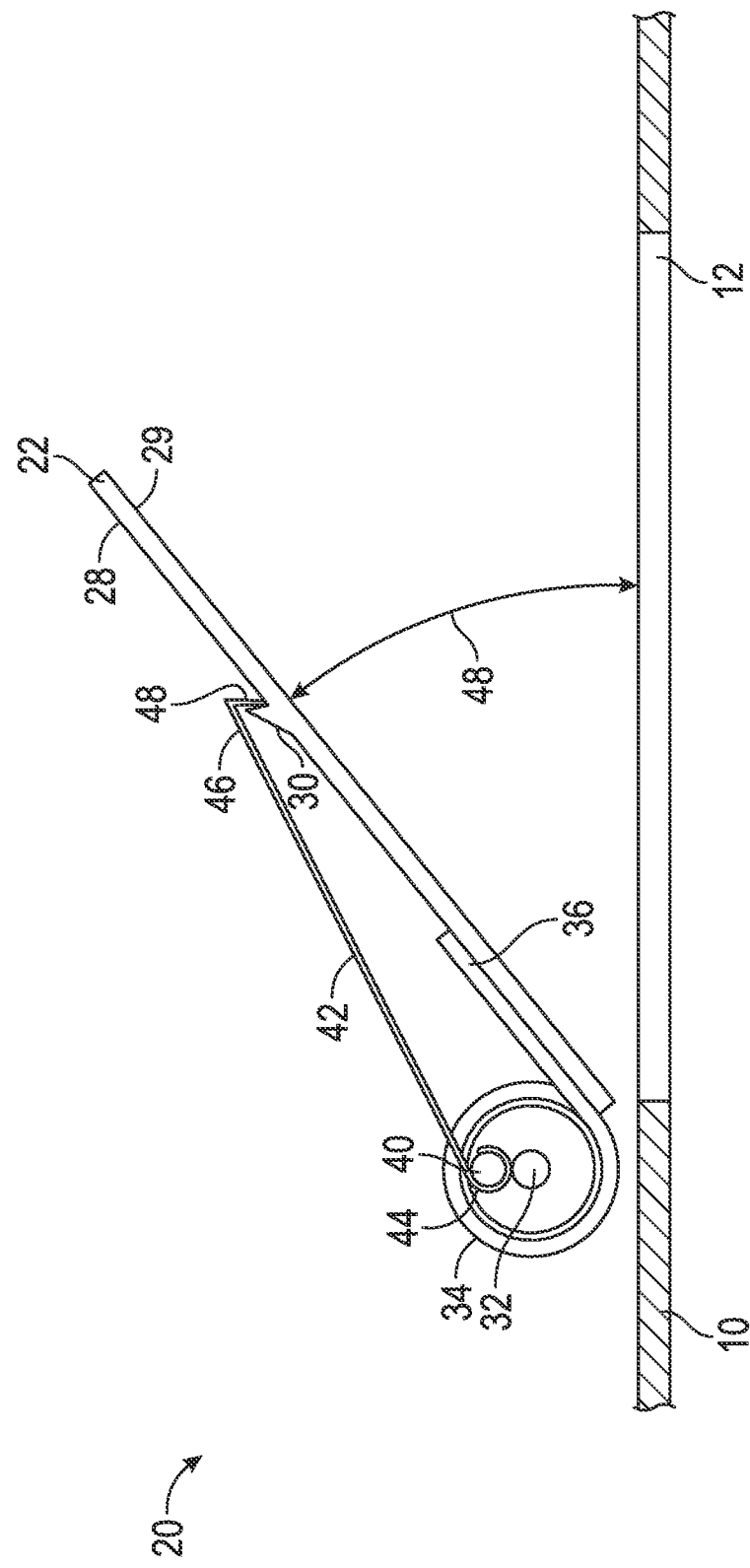
FIG. 3 is a side view of an open pressure relief valve of an ECS according to an embodiment of the invention.

If a pressure less than the predetermined cracking pressure is applied to the second surface 29 of the flapper 22, the biasing mechanism 34 maintains the flapper 22 in the first, closed position such that no fluid flows through the opening 12 in the housing 10. However, if the pressure applied by the fluid is greater than or equal to the predetermined cracking pressure, the flapper 22 will rotate about the hinge 32 to the second, open position (FIG. 3). As the flapper 22 pivots open, the retaining feature 46 of the drag link 42 will slidably contact the first surface 28 of the flapper 22 and rotate about the non-rotatable pin 40. The protrusion 30 of the flapper 22 acts as a ramp such that when the flapper 22 reaches the second, open position, the retaining feature 46 of the drag link 42 engages the underside of the protrusion 30. Once the protrusion 30 and the retaining feature 46 of the flapper 22 are engaged, the flapper 22 remains in the second, open position, engaged with the drag link 42 until the flapper 22 of the flapper relief valve 20 is manually reset, such as by a technician for example.

Figure 4:
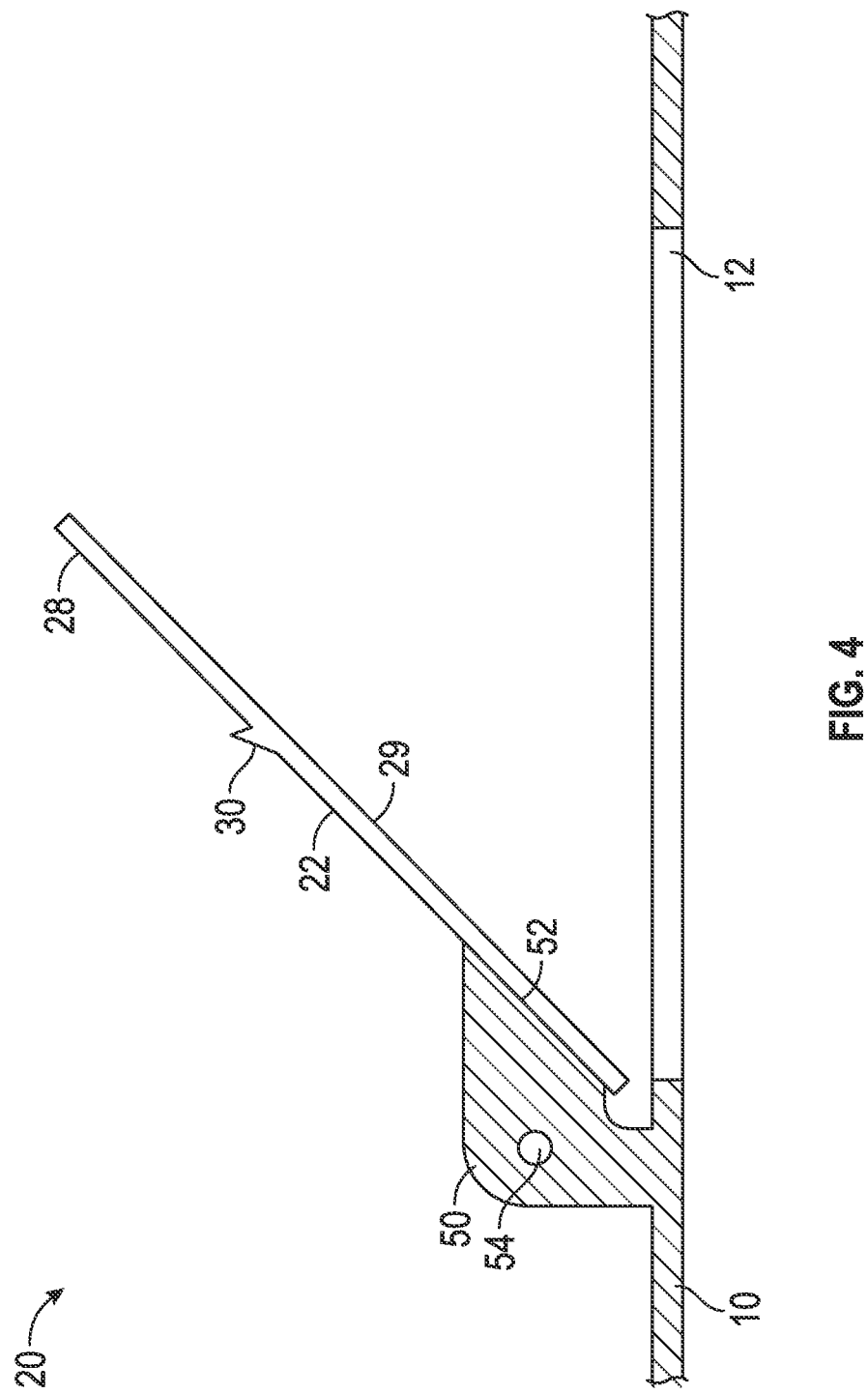
FIG. 4 is a side view of an open pressure relief valve of an ECS according to an embodiment of the invention.

In one non-limiting embodiment, illustrated in FIGS. 1 and 4, a stopper 50 may extend from the housing 10 generally horizontally, in the direction of the flapper 22. An end 52 of the stopper 50 may be substantially angled such that the end 52 is configured to contact the first surface 28 of the flapper 22 to substantially limit further rotation of the flapper 22 about the hinge 32 beyond the second, open position. In one embodiment, the stopper 50 is positioned between the first end 36 of the biasing mechanism 34 and the drag link 42, and the stopper 50 includes a hole 54 within which the non-rotatable pin 40 is received.

Figure 5:
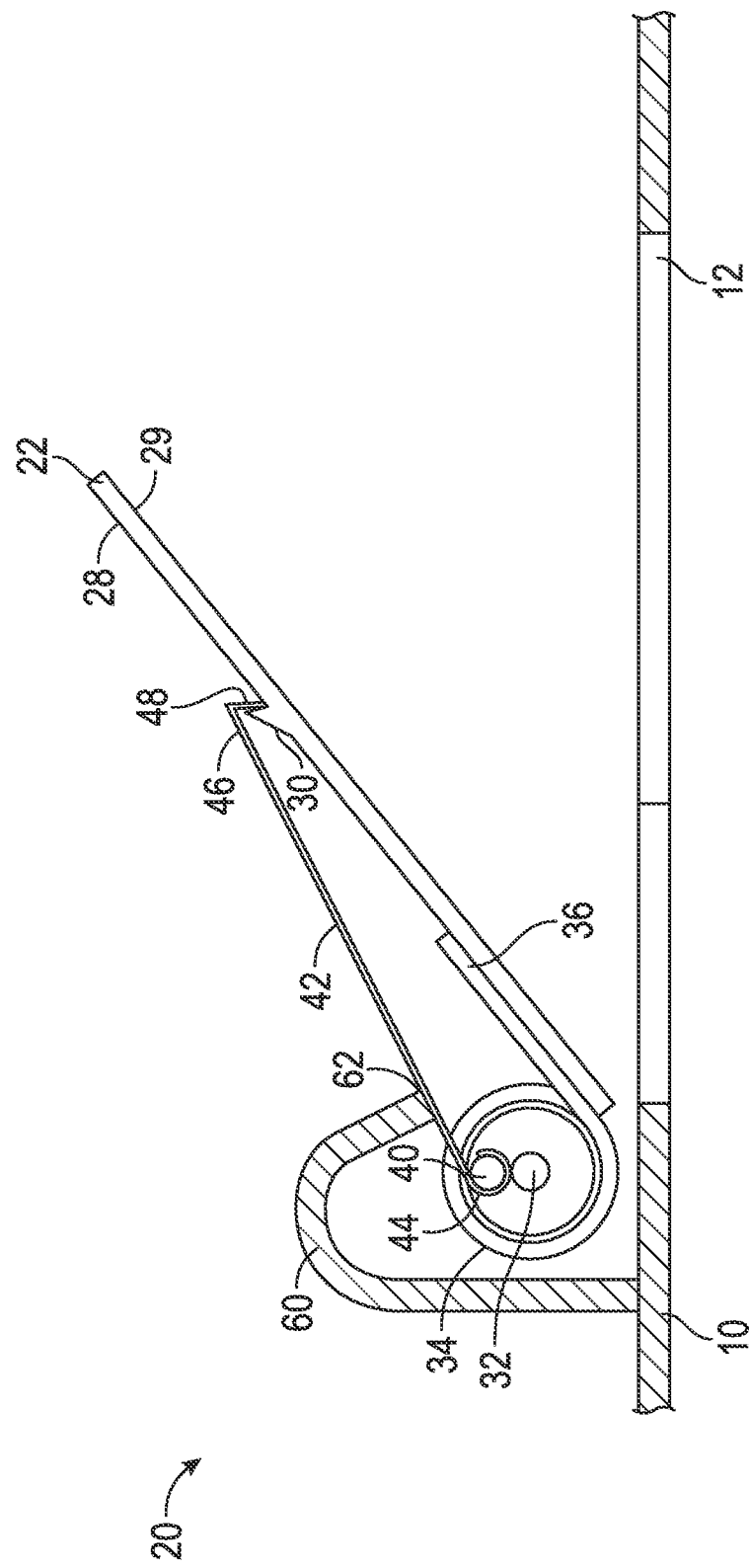
FIG. 5 is a side view of an open pressure relief valve of an ECS according to an embodiment of the invention.

The flapper relief valve 20 may additionally include a stopper 60 extending from the housing 10 generally horizontally, in the direction of the flapper 20 (see FIG. 5). In one embodiment, the end 62 of the stopper 60 is configured to engage a portion of the drag link 42 when the flapper 22 rotates beyond the second, open position. As the flapper 22 rotates beyond the second, open position, the pressure applied by the end 62 of the stopper 60 on the drag link 42 causes the drag link 42 to bow as the flapper 22 contacts stopper 50. By creating this flexure in the drag link 42, the retaining feature 46 and the protrusion 30 are more easily retained in an engaged orientation.

Figure 6:
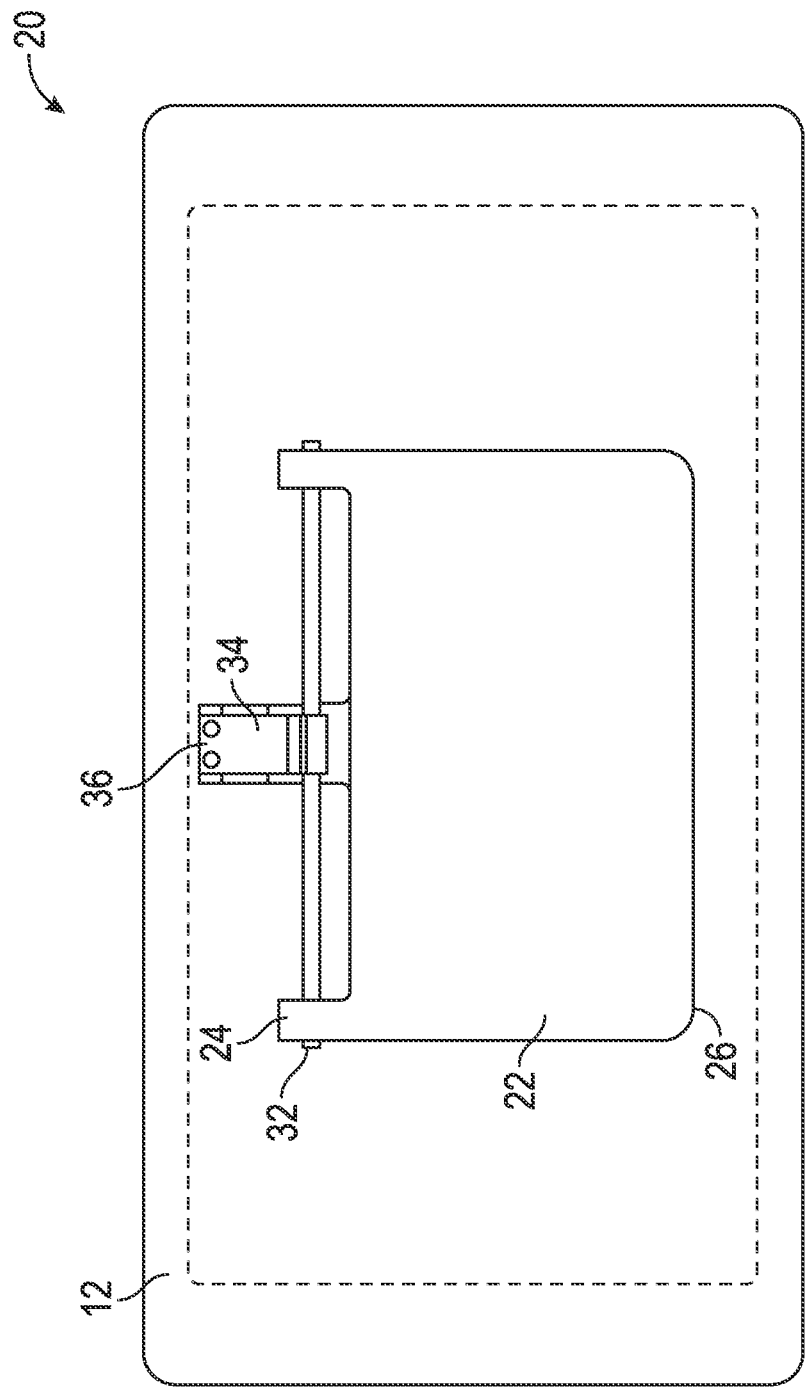
FIG. 6 is a top view of pressure relief valve of an ECS according to another embodiment of the invention.
Figure 7:
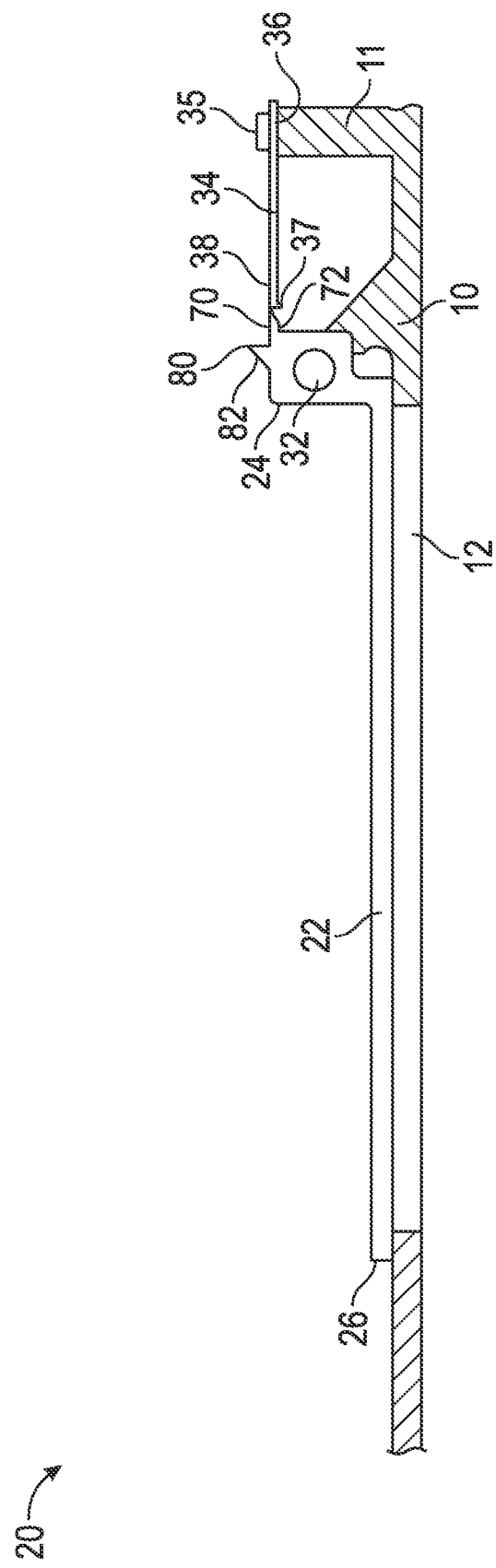
FIG. 7 is side view of a closed pressure relief valve of an ECS according to another embodiment of the invention.
Figure 8:
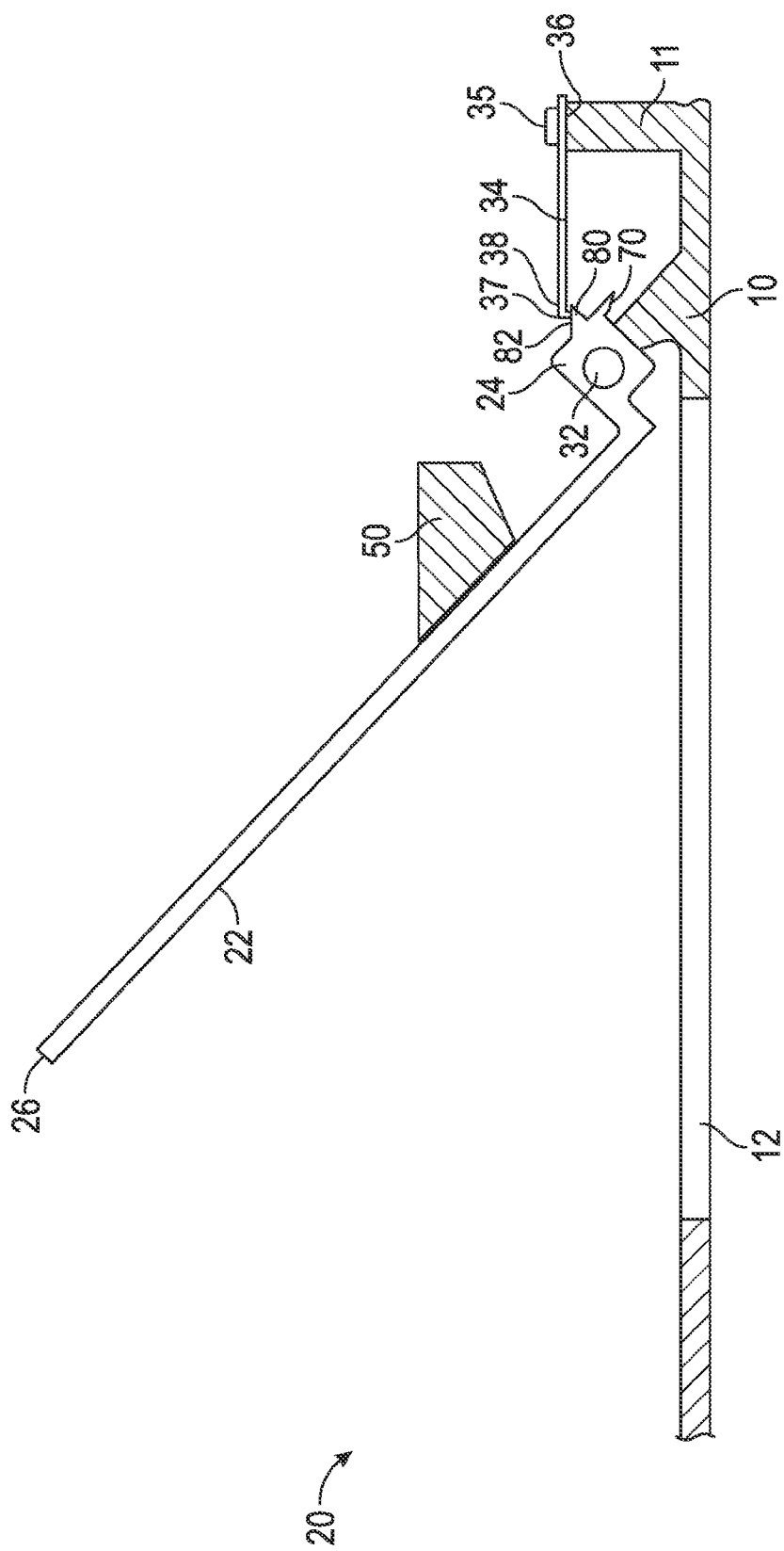
FIG. 8 is a side view of an open pressure relief valve of an ECS according to another embodiment of the invention.

A flapper relief valve 20 according to another embodiment of the invention is illustrated in FIGS. 6-8. Similar to the previous embodiment, the flapper or door 22 is rotatably coupled to the housing 10 at a first end 24, such that the flapper 22 is configured to pivot between a first, closed position (FIG. 6, 7) and a second, open position (see FIG. 8). The first end 24 of the flapper 22 includes a first protrusion 70 extending generally horizontally away from the flapper 22. A second protrusion 80 extends from an upper surface 25 of the first end 24, in a direction generally perpendicular to the first protrusion 70. In one embodiment, a surface 72 of the first protrusion 70 and a surface 82 of the second protrusion 82 are generally angled away from the flapper 22.

In one embodiment, a portion 11 of the housing 10 extends generally perpendicularly to the flapper 22 and parallel to the second protrusion 80. A first end 36 of a biasing mechanism 34, such as a leaf spring for example, is mounted to the housing 10 such that the biasing mechanism 34 is generally cantilevered about portion 11 of the housing 10. The biasing mechanism 34 extends generally horizontally from portion 11 of the housing, towards the first end 24 of the flapper 22, in a plane generally parallel to the first surface 28 of the flapper 22. The biasing mechanism 34 may be fastened to the portion 11 of the housing 10 using a pin, screw, or any other suitable fastener 35. In one embodiment, a retaining feature 37, such as a hook or an L-shaped protrusion for example, is arranged at a second end 38 of the biasing mechanism 34.

When the pressure relief valve is in a first, closed position, the second end 38 of the biasing mechanism 34 is positioned adjacent the angled surface 72 of the first protrusion. The engagement between the second end 38 and the angled surface 72 creates a preload in the biasing mechanism 34 such that a pressure greater than or equal to a predetermined cracking pressure must be applied to the second surface 29 of the flapper 22 to rotate the flapper 22 about pin 32 between the first, closed position and the second, open position. Application of a pressure, at least equal to the predetermined cracking pressure, on the second surface 29 will cause the flapper 22 to pivot about the pin 32. During the rotation of the flapper 22, the second end 38 of the biasing mechanism 34 slides relative to the cam-like angled surface 72 of the first protrusion 70. In addition, the first protrusion 70 applies a force to the second end 38 such that the second end of the biasing mechanism deflects.

As the flapper 22 reaches the second, open position, the first protrusion rotates out of contact with the biasing mechanism 34. The biasing force of the biasing mechanism 34 causes the biasing mechanism 34 to rotate in the direction indicated by arrow A, towards its original, un-flexed position. The retaining feature 37 on the second end 38 of the biasing mechanism 34 contacts the angled surface 82 of the second protrusion 80 to retain the flapper 22 in the second, open position such that the biasing mechanism 34 functions as a latch. Once the second protrusion 80 and the retaining feature 47 are engaged, the flapper 22 remains in the second, open position, until the flapper 22 of the flapper relief valve 20 is manually reset. As previously described, an adjacent stopper 50 may be configured to limit movement of the flapper 22 beyond the second, open position (see FIG. 8).

Inclusion of a flapper relief valve 20 within an ECS of an aircraft will prevent damage to a fan of the ECS by opening, and staying open once the pressure reaches a predetermined cracking pressure. In addition, because the valve 20 remains in the second, open position until the valve 20 is manually reset, the valve 20 may act as an indicator to maintenance personnel that the adjacent filter needs cleaning or replacement.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A flapper relief valve, comprising:
    a flapper pivotally mounted to a housing via a connection means such that the flapper is movable between a first position and a second position, wherein a protrusion extends from a first surface of the flapper;
    a biasing mechanism having a non-rotatable pin and positioned near a first end of the flapper, the biasing mechanism being arranged around the connection means configured to apply a biasing force to a first surface of the flapper;
    the non-rotatable pin having an axis parallel to an axis of the biasing mechanism; and
    a drag link configured to pivot about the non-rotatable pin, the drag link including a retaining feature and being substantially aligned with the protrusion on the flapper such that when the flapper rotates to the second position the retaining feature engages the protrusion to retain the flapper in the second position.

2. The flapper relief valve according to claim 1, wherein the biasing mechanism includes a torsion spring.

3. The flapper relief valve according to claim 1, wherein the biasing force of the biasing mechanism is generally less than a predetermined cracking pressure.

4. The flapper relief valve according to claim 1, wherein the retaining feature is configured to slidably contact the first surface of the flapper as the flapper rotates from the closed position to the open position.

5. The flapper relief valve according to claim 4, wherein the protrusion extends at an angle from the first surface of the flapper, in a direction away from the drag link.

6. The flapper relief valve according to claim 5, wherein the protrusion and the retaining feature remain engaged until serviced by a maintenance person.

7. The flapper relief valve according to claim 1, further comprising a stopper extending from the housing, the stopper being configured to engage the first surface of the flapper to limit movement of the flapper beyond the second position.

8. The flapper relief valve according to claim 7, wherein the stopper is generally positioned between the biasing mechanism and the drag link.

9. The flapper relief valve according to claim 7, further comprising a second stopper extending from the housing, the second stopper being configured to flex the drag link such that the retaining feature and the protrusion remain engaged when the flapper is rotated beyond the second position.

\* \* \* \* \*